United States Patent
Cavazos et al.

(10) Patent No.: US 6,981,749 B2
(45) Date of Patent: Jan. 3, 2006

(54) BICYCLE WHEEL WITH SPINNER ATTACHMENT

(76) Inventors: Eloy Cavazos, 1941 S. Ybarra Ave., Santa Maria, CA (US) 93458; Andrew Oliva, 5689 Shilo Ct., Santa Maria, CA (US) 93455

( * ) Notice: Subject to any disclaimer, the term of this patent is extended or adjusted under 35 U.S.C. 154(b) by 136 days.

(21) Appl. No.: 10/751,513

(22) Filed: Jan. 6, 2004

(65) Prior Publication Data

US 2005/0146201 A1 Jul. 7, 2005

(51) Int. Cl.
*B60B 7/20* (2006.01)
(52) U.S. Cl. .................. 301/37.25; 301/37.41
(58) Field of Classification Search .......... 301/37.101, 301/37.102, 37.25, 37.41; 40/587
See application file for complete search history.

(56) References Cited

U.S. PATENT DOCUMENTS

| | | | |
|---|---|---|---|
| 639,567 A * | 12/1899 | Henderson | .................. 280/217 |
| 2,621,081 A | 12/1952 | Mann | |
| 2,762,469 A | 9/1956 | Lyon | |
| 2,997,344 A | 8/1961 | Whiteman | |
| 3,005,906 A | 10/1961 | Butler, Jr. | |
| 3,158,946 A | 12/1964 | Upchurch | |
| 3,219,391 A | 11/1965 | Hettinger | |
| 3,602,550 A | 8/1971 | Patane et al. | |
| 3,722,958 A | 3/1973 | Marshall | |
| 3,787,066 A * | 1/1974 | Hautier | ....................... 280/217 |
| 3,847,443 A | 11/1974 | Laurion | |
| 4,712,838 A | 12/1987 | Berg et al. | |
| 5,290,094 A | 3/1994 | Gragg | |
| 5,332,294 A * | 7/1994 | Haeussinger | ............. 301/110.5 |
| 6,554,370 B2 | 4/2003 | Fowlkes | |
| 6,776,459 B2 * | 8/2004 | Fitzgerald | ................ 301/37.25 |
| 2003/0102712 A1 | 6/2003 | Pitzgerald | |
| 2005/0062334 A1 * | 3/2005 | Smith et al. | ............. 301/37.25 |

FOREIGN PATENT DOCUMENTS

| DE | 3919268 | 1/1991 |
|---|---|---|
| WO | WO 87/00802 | 2/1987 |

* cited by examiner

*Primary Examiner*—Russell D. Stormer
(74) *Attorney, Agent, or Firm*—Richard C. Litman

(57) ABSTRACT

The bicycle wheel with spinner attachment is a bicycle wheel and removable spinner attachment for the front and rear wheels of a bicycle. The wheel has a hub, a rim and a structural member connecting the hub to the rim. The structural member can be decorative spokes, a thin plate or flat plates that extend up from the hub to the rim. The hub has hub extensions extending from the wheel. A spinner mount is disposed on each hub extension and fixed to the wheel. A bearing assembly is mounted on the spinner mount, and a spinner is attached to the bearing assembly for rotation when the bicycle accelerates. The spinner continues to rotate by inertia when the bicycle is stopped. Preferably the wheel is made as a unitary body resembling an automobile wheel in ornamental appearance.

12 Claims, 11 Drawing Sheets

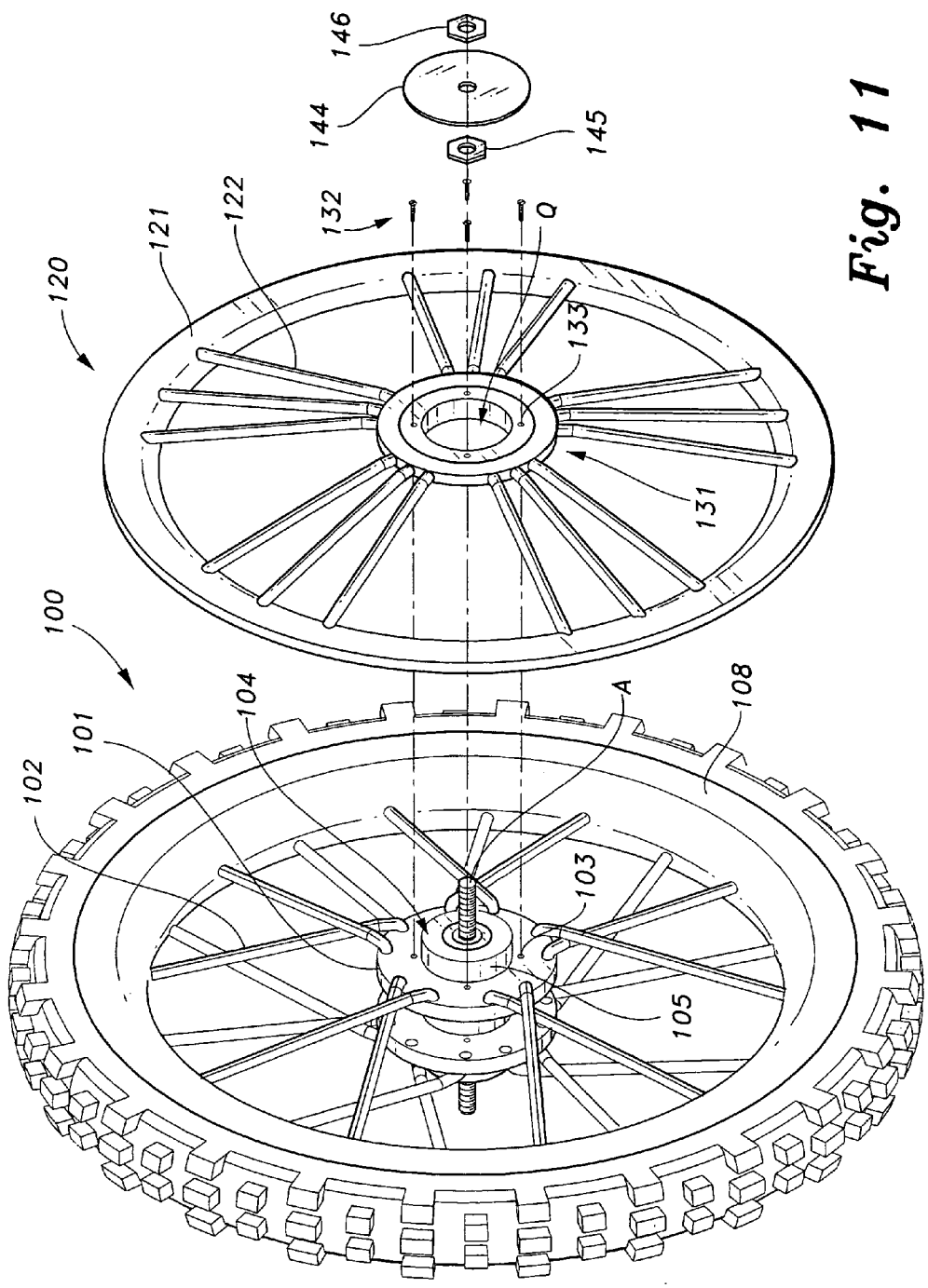

BICYCLE WHEEL WITH SPINNER ATTACHMENT

BACKGROUND OF THE INVENTION

1. Field of the Invention

The present invention relates to bicycle wheel ornamentation. More particularly, the present invention relates to a bicycle wheel having a spinner attachment, where the spinner is removably fixed to the wheel and spins independent of the bicycle wheel.

2. Description of the Related Art

Bicycle enthusiasts, especially owners of lower rider bicycles, take pleasure in embellishing their bicycle. Just like with cars, one focal point on a bicycle is the wheel. Wheel ornamentation is popular among many car owners, as evidenced by chrome wheel covers/rims, rotating hubcaps or spinning ornaments that have been developed for the car wheel. Although accessories for car wheels are numerous, few ornamental attachments have been developed for bicycle wheels. Most decorations for a bicycle wheel have been disposed between the spokes, or comprise wheel covers that conceal the spokes.

Due to the inherent difference between a bicycle wheel and car wheel, the advancements in car wheel covers and hubcaps have not been utilized for bicycle wheels. Car wheels expose only one side of the wheel and they are held in place with lug nuts. Bicycle wheels, on the other hand, are positioned on an axle and do not require lug nuts. Also, because bicycle wheels expose both the left and right side of the wheel, any decoration added to the wheel must be visible from either side of the bicycle wheel.

A number of spinning wheel covers or hubcaps have been developed for cars. However, a rim and spinner combination for both exterior portions of the bicycle wheel that contributes to the decorative appeal of the bicycle wheel is desired.

U.S. Patent Publication Number 2003/0102712, published on Jun. 5, 2003, describes an automobile wheel ornament in the form of a spinner and an adapter. The adapter is attached to the wheel by lug nuts and provides a mounting surface for the spinner. The adapter has a variety of bolt-hole openings to accommodate for the different types of lug nut patterns on a car wheel. The spinner rotates, whether or not the wheel is in motion, because of a ball bearing system positioned between the spinner and the adapter.

U.S. Pat. No. 3,158,946, issued to Upchurch on Dec. 1, 1964, describes a spinning hubcap for the exterior face of a vehicle's wheels. The hubcap has two parts, including a rotating outer spoke portion and a stationary inner metal disc. The wheel has an annular rim that holds the disc in place and an axial tube extending from the center of the wheel to which the hubcap mounts. The spoke portion of the hubcap is mounted on the axial tube by a ball bearing system. As the wheel rotates forward, the spoke portion of the hubcap also rotates forward. The spokes continue to rotate forward, even after the wheel stops because of inertia and the bearing system. The bearing system works in conjunction with a ratchet and cam system.

U.S. Pat. No. 5,290,094, issued to Gragg on Mar. 1, 1994, describes an automotive wheel enhancer mounted to the center cap of a wheel. A mounting piece holds the wheel enhancer to the wheel. The mounting piece comprises a first mounting member that houses a second mounting member. Each mounting member has a threaded stud facing opposite directions from one another. One stud is inserted into the wheel enhancer and the other stud is inserted into the wheel. A bearing system located between the mounting members permit the members to rotate independently of one another, and consequently the wheel enhancer to rotate independently of the wheel.

U.S. Pat. No. 2,997,344, issued to Whiteman on Aug. 22, 1961, describes a wheel cover for motor vehicles. The wheel cover is a two-part hubcap having a rotating colored inner hub and a stationary outer hub. The outer hub is fixedly attached to the wheel. The inner hub is mounted on a bolt by a bearing assembly and rotates independently of the outer hub, therefore when the wheel and the outer hub stops rotating the inner hub continues to spin due to inertia. German Patent Number 3,919,268, published on Jan. 3, 1991, shows a hubcap having an inner hub and an outer hub. The inner hub is attached to the wheel and supports the outer hub. When the wheel is in motion, the inner hub rotates with the wheel, but the outer hub is relatively stationary because of a weight placed on the edge of the outer hub.

Other spinning wheel ornaments have been developed that uses weights to modify rotation speed or air to move the wheel's ornament. U.S. Pat. No. 6,554,370, issued to Fowlkes on Apr. 29, 2003, describes a wheel spinner assembly that rotates independently of the wheel due to a bearing system. The bearing assembly attaches the spinner to the wheel in one of three places: at the center of the spinner, at the distal ends of the spinner's spoke, or around the wheel mount. Screws inserted into the distal ends of the spinner spoke weigh the spinner down and allow the spinner to rotate at a different speed from the wheel's cover.

U.S. Pat. No. 3,005,906, issued to Butler Jr. on Oct. 24, 1961, describes a hubcap ornament for a vehicle in the form of a rocket. The rocket is mounted on a screw that is inserted through the center of the hubcap. The rocket moves only 90°. The rocket is horizontal when air pressure pushes a fin/vane disposed at the rocket's bottom up; otherwise the rocket remains vertical because of gravity pulling down on a weight located at the bottom of the rocket.

U.S. Pat. No. 3,722,958, issued to Marshall on Mar. 27, 1973, describes a wheel cover for automotive vehicles that rotates independently of the wheel's rotation, producing a decorative effect. The wheel cover rotates around a shaft by a bearing system due to the wheel's motion as well as air force drawn past louvers disposed on the cover. The cover rotates independently of the wheel. The shaft can be attached to the wheel by lugs.

U.S. Pat. No. 3,219,391, issued to Hettinger on Nov. 23, 1965, describes a wheel disc cover for automobiles, motorcycles, bicycles, etc. that rotate independently of the wheel's motion. The cover is mounted on a shaft over a ball bearing system. The cover rotates because of air flowing past a number of raised air scoops disposed on the cover's surface. The cover rotates in either a forward direction or a rearward direction, depending on which direction the open side of the air scoops face.

U.S. Pat. No. 2,762,469, issued to Lyon on Sep. 11, 1956, describes a wheel cover having a number of openings and vanes adjacent to each opening disposed on the surface of the cover. The wheel cover is mounted by a bearing assembly on a spindle to a hub of the wheel. The vanes at the openings on the wheel cover are set at fixed intervals and are moved by slipstream air. The air entering the vanes is used to cool the brake drum.

Wheel covers for bicycles have been developed that cover the spokes to both reduce air resistance and decorate the wheel. U.S. Pat. No. 3,602,550, issued to Patane et al. on Aug. 31, 1971, describes a bicycle wheel cover used for decorative purposes. The wheel cover is made of moldable thermoplastic resin and is coated with an outer layer of metallized paint to simulate metal parts. The cover comprises two plates that sit over and sandwich the spokes of the wheel. The cover can be cut to accommodate any size hub of a wheel. The edges of the cover fit into the rim of the wheel and the inner portion conforms to the wheel spokes.

U.S. Pat. No. 4,712,838, issued to Berg et al. on Dec. 15, 1987, describes a disc cover for spoked wheels. The cover is made of flexible material that stretches from the hub of the wheel to the wheel's rim and serves to reduce air resistance. The cover is made of fabric or flexible plastic and is easily removable for washing or cleaning. W.I.P.O. U.S. Pat. No. 8,700,802, published on Feb. 12, 1987, describes a lightweight wheel cover made of stretch material, such as nylon, for use on spoked wheels of bicycles. The cover comprises two opposing covers that surround the spokes of the wheel to help reduce drag created by air cutting through the wheel's spokes.

Still discussing bicycle wheels, some ornamental designs have been developed for use between the spokes of a bicycle wheel. U.S. Pat. No. 2,621,081, issued to Mann on Dec. 9, 1952, describes an ornamental bicycle wheel attachment for wire wheels. The ornament is a flat spiral made of semi-rigid paper, cardboard, plastics or metallic material. The ornament is disposed in the space between the left and right groups of wire spokes on the bicycle.

U.S. Pat. No. 3,847,443, issued to Laurion on Nov. 12, 1974, describes a wheel ornament. The ornament is a decorated, annular, planar sheet forming spiral strips that radiate outward from the center of the sheet. The ornament is not interlaced between the spokes but is disposed in the space between the left and right group of spokes.

None of the above inventions and patents, taken either singly or in combination, is seen to describe the instant invention as claimed. Thus a bicycle wheel with spinner attachment solving the aforementioned problems is desired.

SUMMARY OF THE INVENTION

The bicycle wheel with spinner attachment of the present invention is a modified bicycle wheel and removable spinner attachment for the front and rear wheels of a bicycle. A conventional bicycle wheel has a hub formed from a hollow cylindrical body having circular plates or flanges extending from opposite ends. The rim is attached to the circular plates by spokes, blades, a thin plate, or the like.

In a preferred embodiment, the present invention features a bicycle wheel designed to resemble an automobile wheel. The bicycle wheel has a rim, a hub, and a connecting member which may be blades, a plate, spokes, or other ornamental body resembling an automobile wheel, all made as a unitary body. The hub, or surrounding connecting member, defines threaded bores which receive screws or other fasteners attaching a spinner mount to a hub extension of the wheel. The spinner mount may be part of an internal bearing assembly built in to the spinner attachment. The spinner blades are mounted to the bearing assembly to rotate when the bicycle is accelerated, and to continue rotating through inertia when the bicycle is brought to a stop.

Alternatively, the bicycle may have a wheel resembling a conventional spoked wheel. In order to accommodate the spinner attachment, however, the present invention uses a bicycle wheel hub in which the circular plates are recessed from the ends of the cylindrical hub housing in order to define a hub extension.

The spinner is attached to the bicycle wheel by providing a spinner mount that is placed over the hub extension and attached to the circular plate by fasteners. The spinner mount has an annular groove defined therein that receives a bearing assembly. The spinner may have ornamental blades, an ornamental disc, or the like, and is attached to the bearing assembly so that the spinner rotates when the bicycle is accelerated, and continues to spin after the bicycle is stopped due to inertia. The spinner attachment may also include a decorative cap placed over the end of the hub.

BRIEF DESCRIPTION OF THE DRAWINGS

FIG. 11 is an exploded, perspective view showing an alternative ornamental design of the spinner attachment according to the present invention.

Similar reference characters denote corresponding features consistently throughout the attached drawings.

DETAILED DESCRIPTION OF THE PREFERRED EMBODIMENTS

Figure 1:
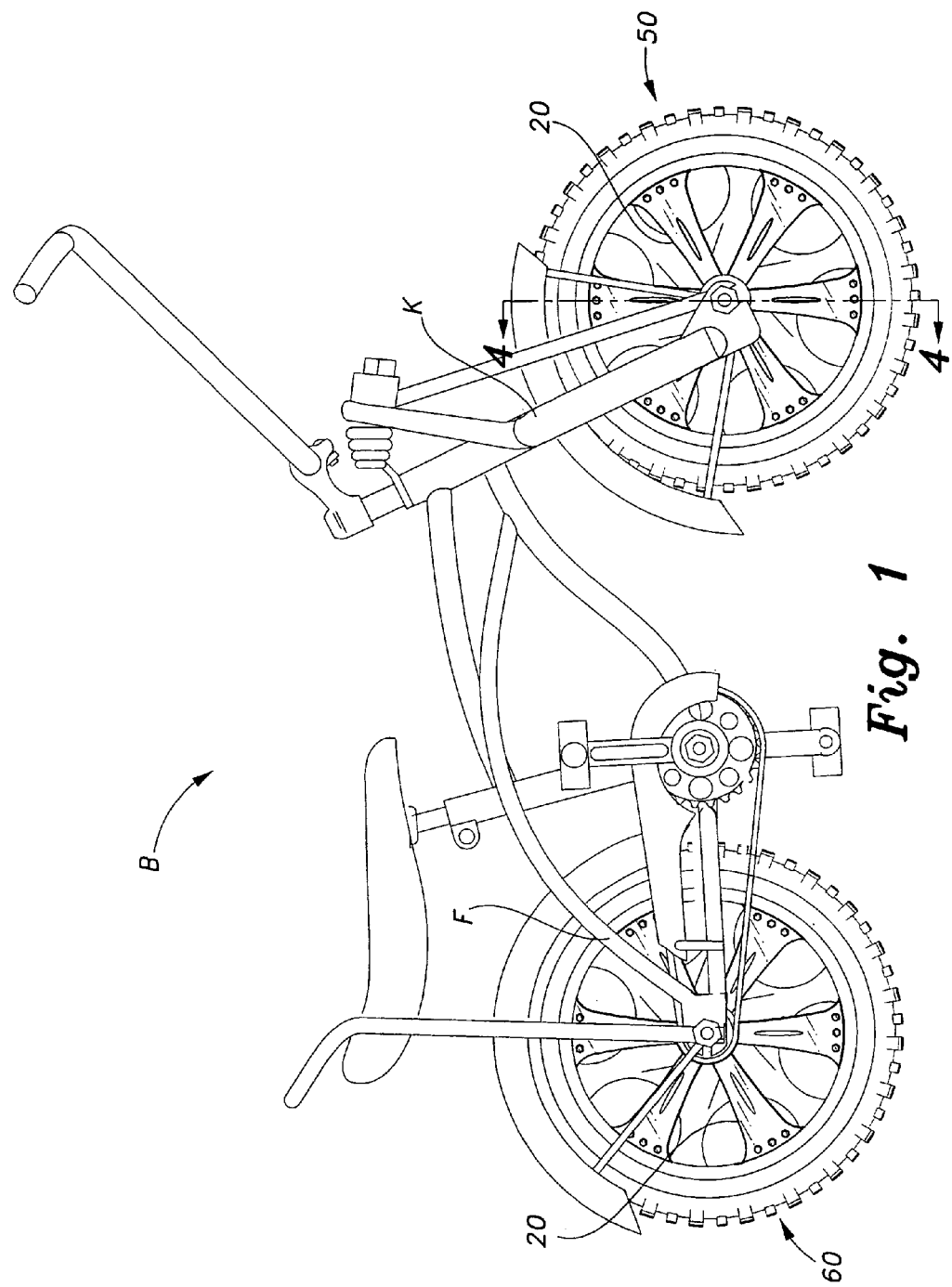
FIG. 1 is an environmental, perspective view of a bicycle wheel with spinner attachment according to the present invention.

The present invention is a bicycle wheel with spinner attachment, designated generally as 20 in the drawings. The spinner 20 is removably mounted on both sides of a modified bicycle B wheel 50, 60. On the front wheel 50 the spinners 20 are located between the wheel 50 and a fork K. On the rear wheel 60 the spinners 20 are located between the wheel 60 and either a brake arm or a sprocket gear of the bicycle B, with frame disposed on the outer side of the brake arm and the sprocket gear.

Details of a typical front bicycle wheel 50 equipped with the spinner attachment 20 are shown in FIGS. 2–5. The front wheel 50 has a central opening O and the spinner 20 has a central opening P. The central openings O, P of the wheel 50 and the spinner 20, respectively, are coaxially aligned with the axle A and with one another. The central opening O of the wheel 50 has a diameter slightly wider than the diameter of the axle A of the bicycle B. The axle A, therefore, slides through the central opening O of the wheel 50 and allows the wheel 50 to mount on the axle A.

The wheel 50 has a hub 54, a rim 48 and at least one structural member 52 connecting the rim 48 to the hub 54, all made as a unitary structure. Preferably the structural member 52 has an ornamental design resembling an automobile wheel, e.g., a plate having scallops defining blades, etc. The rim 48 of the wheel 50 supports a bicycle tire T, while the hub 54 defines the central opening O of the wheel 50. A number of threaded bores 53 are defined either in, above or around the hub 54 or in the structural member 52 of the wheel 50 to receive fasteners 32. The threaded bores' 53 are preferably located within about a 2½" or 3½" radius from the center of the wheel 50.

The structural member 52 forms the exterior surface(s) of the wheel 50. In the drawings, the structural member 52 comprises two plates facing opposing sides of the wheel 50 and having optional decorative features, such as indentations or depressions 51 and scalloped openings 58. In alternative embodiments, the structural member 52 can be spokes or one thin plate extending between the hub 54 and the rim 48.

The spinner 20 possesses a number of arms 22 each having a lower end 22b and an upper end 22a. The number of arms 22 is shown to be six, but the arms 22 can be more or less than six. The upper end 22a of the spinner arms 22 have a number of threaded openings 24 to receive bolts 28. Three bolts 28 are shown threaded into each arm 22 in FIG. 2, but more or less than three can be used on the arms 22. The bolts 28 add weight to the spinner 20, allowing the spinner 20 to rotate at a different speed from the wheel 50 and adding a flywheel effect to keep the spinner 20 rotating after the bicycle is stopped. Additionally, the arms 22 may also be decorated with indentations or depressions 21. Both indentations 21 and bolts 28 are optional features added to the spinner 20.

The lower end 22b of the arms 22 attach to and radiate out from a bearing system 31. The bearing system 31 serves many purposes. The bearing system 31 defines the central opening P of the spinner 20, serves aas a spinner mount permitting the spinner 20 to mount on the wheel 50, and permits the spinner 20 to spin independently of the wheel 50. The bearing system 31 is provided as an integral feature of the spinner 20.

Figure 3:
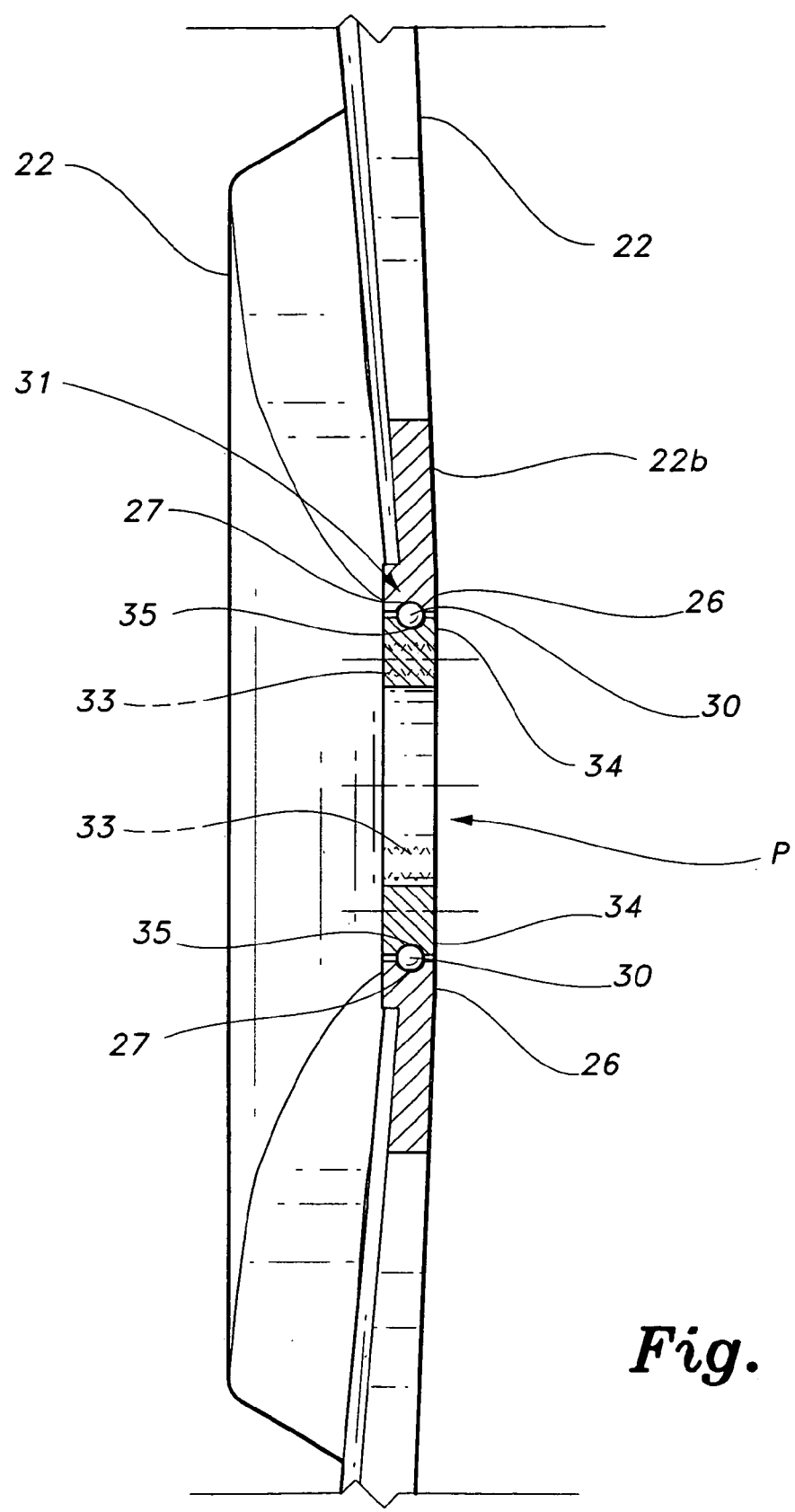
FIG. 3 is a section along the lines 3—3 of FIG. 2.

As shown in FIG. 3, the bearing system 31 has an outer ring 26, an inner ring 34 and ball bearings 30. The inner ring 34 has an inner peripheral surface and an outer peripheral surface. The inner peripheral surface defines the central opening P of the bearing system 31, and consequently the spinner 20. The diameter of the central opening P of the inner ring 34 is wider than the diameter of the hub 54, permitting the inner ring 34 slide over a portion of the hub protruding from structural member 52, which is referred to herein as a hub extension 55. The outer surface of the inner ring 34 defines an inner race groove 35 to receive the ball bearings 30.

Figure 2:
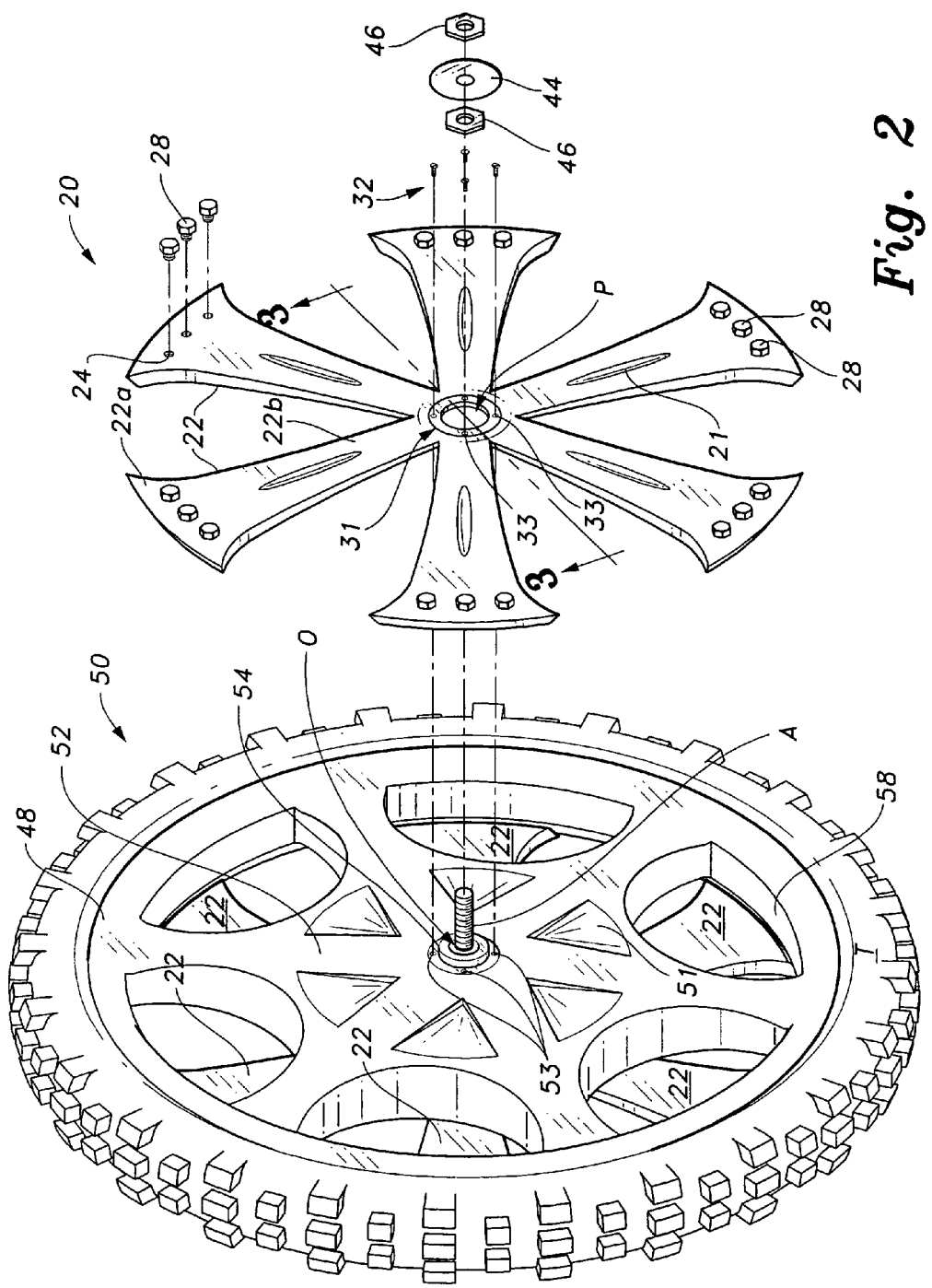
FIG. 2 is an exploded, perspective view of a front wheel of the bicycle with the spinner attachment according to the present invention.

Referring now to FIG. 3 in conjunction with FIG. 2, disposed between the inner peripheral surface and the outer peripheral surface of the inner ring 34 are a number of openings 33 that align with and correspond in number to the threaded bores 53 defined in wheel 50. The number of threaded openings 33 and 53 is preferably four, but can be any number that secures the spinner 20 to the wheel 50. Fasteners 32 are inserted through openings 33 and threaded into bores 53 to secure the spinner 20 to the wheel 50. Thus, the inner ring 34 serves as a spinner mount attaching spinner 22 to wheel 50.

The outer ring 26 also has an outer peripheral surface and an inner peripheral surface. The outer surface of the outer ring 26 serves as the point of attachment for the lower end 22b of the spinner arms 22. The inner peripheral surface of the outer ring 26 defines an outer race groove 27 to accommodate the ball bearings 30. The ball bearings 30 are sandwiched between the outer ring 26 and the inner ring 34 for free rotation within the raceway grooves 27 and 35. Other bearing assemblies may be used having more or less features than the ones mentioned above. For example, a retainer may be used to hold the ball bearings or a double raceway may be disposed between the inner ring 34 and the outer ring 26.

The spinner 20 mounts to the wheel 50 by threading fasteners 32 through openings 33, disposed within the inner ring 34 of the spinner 20, and into threaded bores 53 of the wheel disposed in the region of the structural member 52 surrounding the hub 54. Alternatively, if it is desired to remove the spinner 20 from the wheel 50, the fasteners 32 can be threaded directly into threaded bores 53 of the wheel 50. Threading the fasteners 32 through both the openings 33 of the inner ring 34 and into the hub 54 removably fixes the inner ring 34 portion of the bearing system 31 to the wheel 50. Thus, the inner ring 34 rotates with the wheel 50. The fasteners 32 may be hex bolts or screws.

The outer ring 26 of the bearing system 31, unlike inner ring 34, is not fixed to the wheel 50. The outer ring 26 is the part of the bearing system 31 that allows the spinner 20 to spin independently of the wheel 50 even after the wheel 50 stops spinning. The spinner 20 acquires its initial momentum to move from the rotation of the wheel 50 by way of the inner ring 34. However, once the wheel 50 and the inner ring 34 stops rotating, the ball bearings permit rotation of the spinner arms 22.

Figure 4:
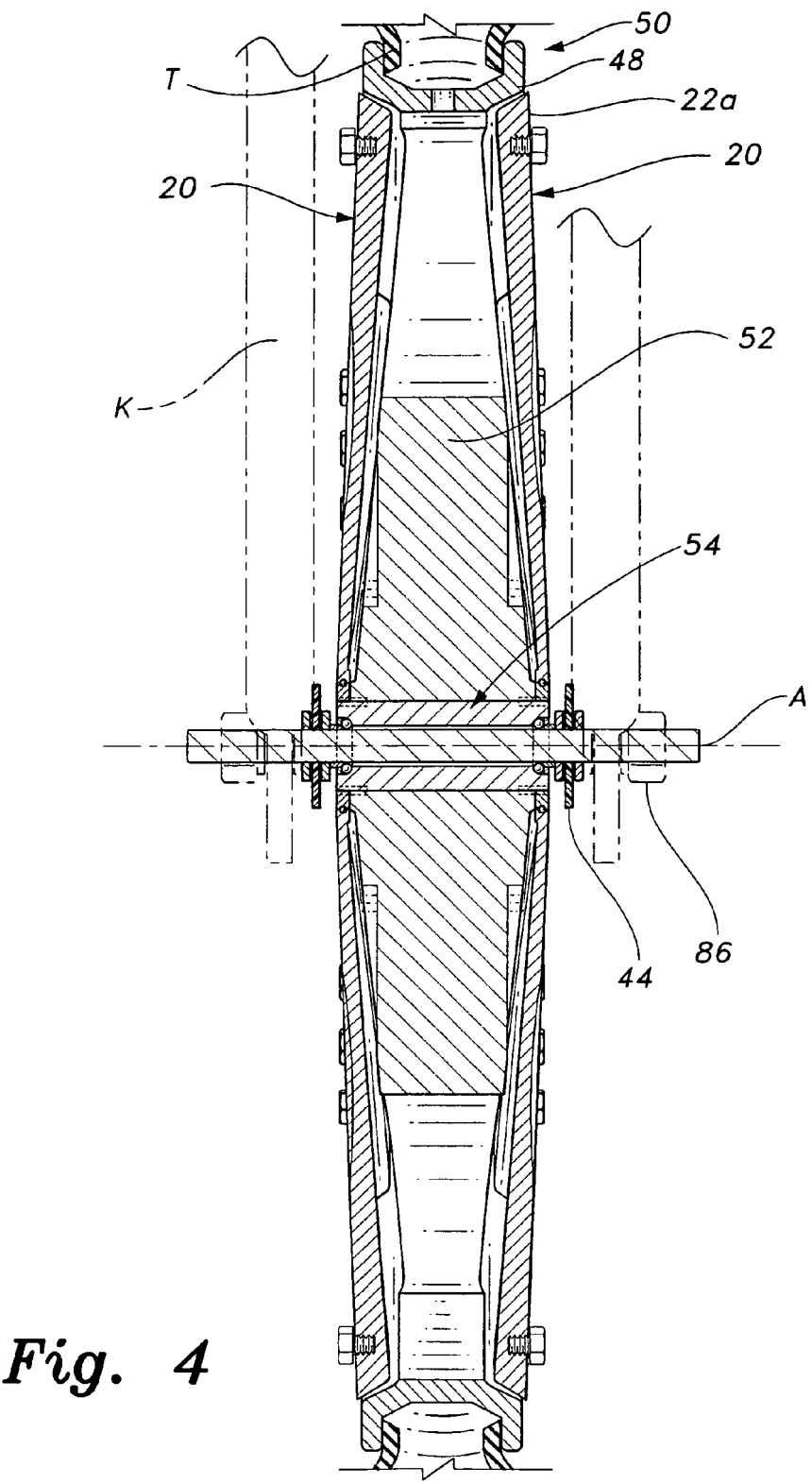
FIG. 4 is a section view along the lines 4—4 of FIG. 1.

Referring now to FIG. 4, a cross-sectional view of the front wheel 50 is shown with two spinners 20 disposed on both is sides of the wheel 50 and the fork K disposed on the axle A on the outer side of the spinners 20. Like traditional bicycle wheels, the structural member 52 of the front wheel 50 is wider at the hub 54 than at the rim 48. The decreasing width of the structural member 52 from the hub 54 toward the rim 48 provides space for the upper edge 22a of the spinner arms 22 to rotate unhindered by the structural member 52.

Figure 5:
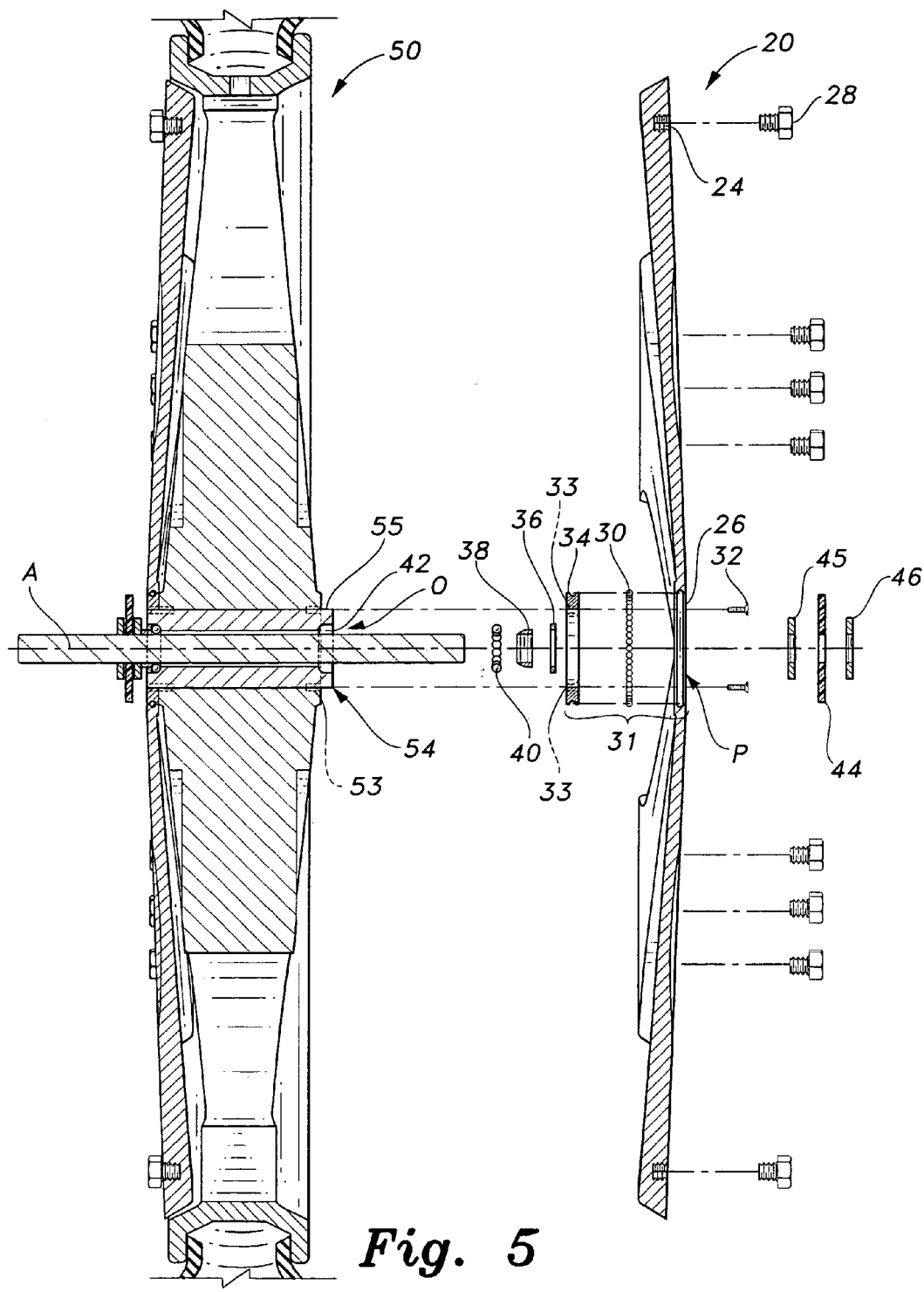
FIG. 5 is an exploded view of the section shown in FIG. 4.
Figure 6:
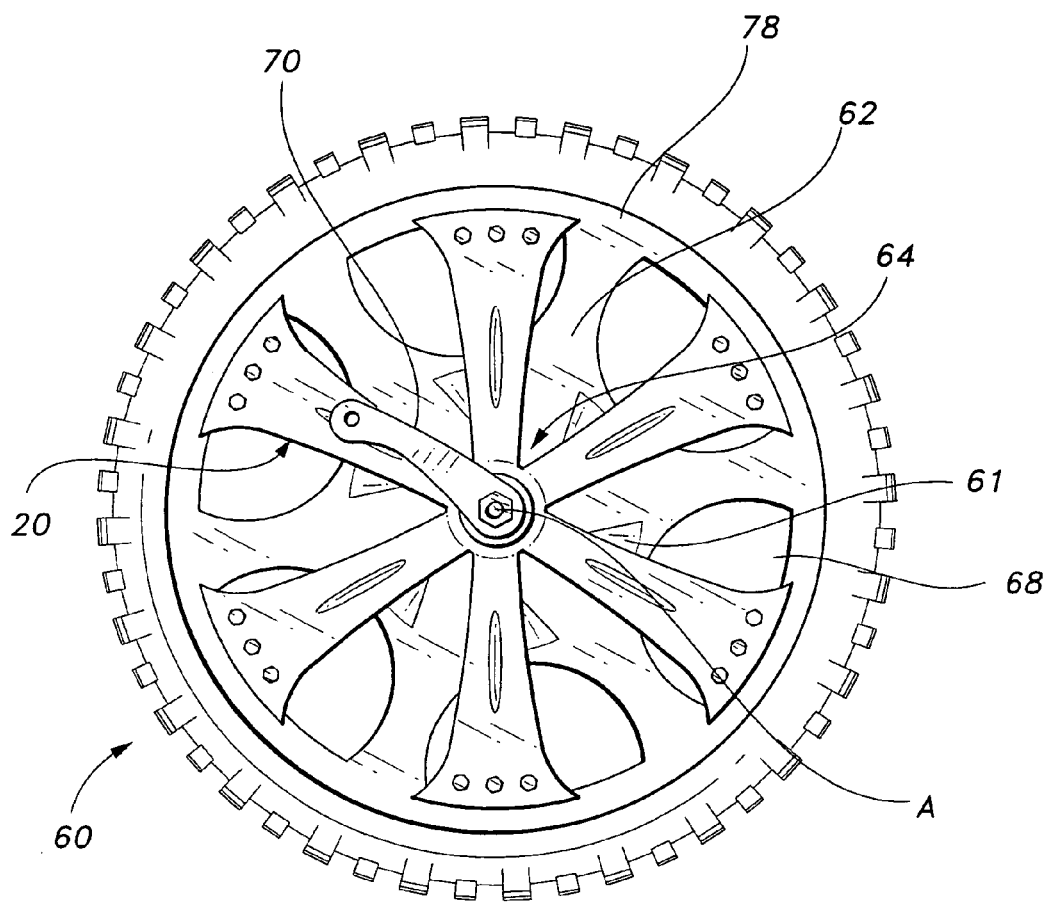
FIG. 6 is an elevational view of the rear bicycle wheel with spinner attachment according to the present invention.
Figure 7:
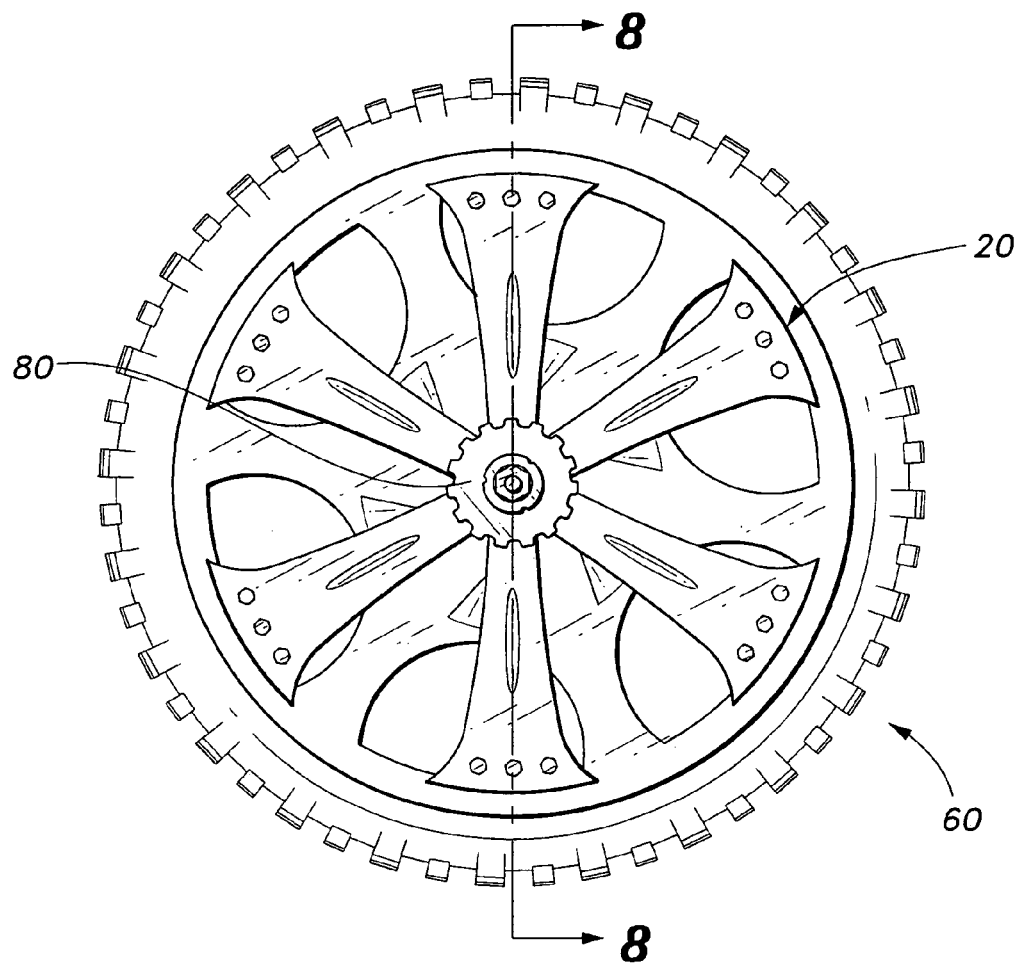
FIG. 7 is an elevational view of the opposite side of the rear wheel of FIG. 6.
Figure 8:
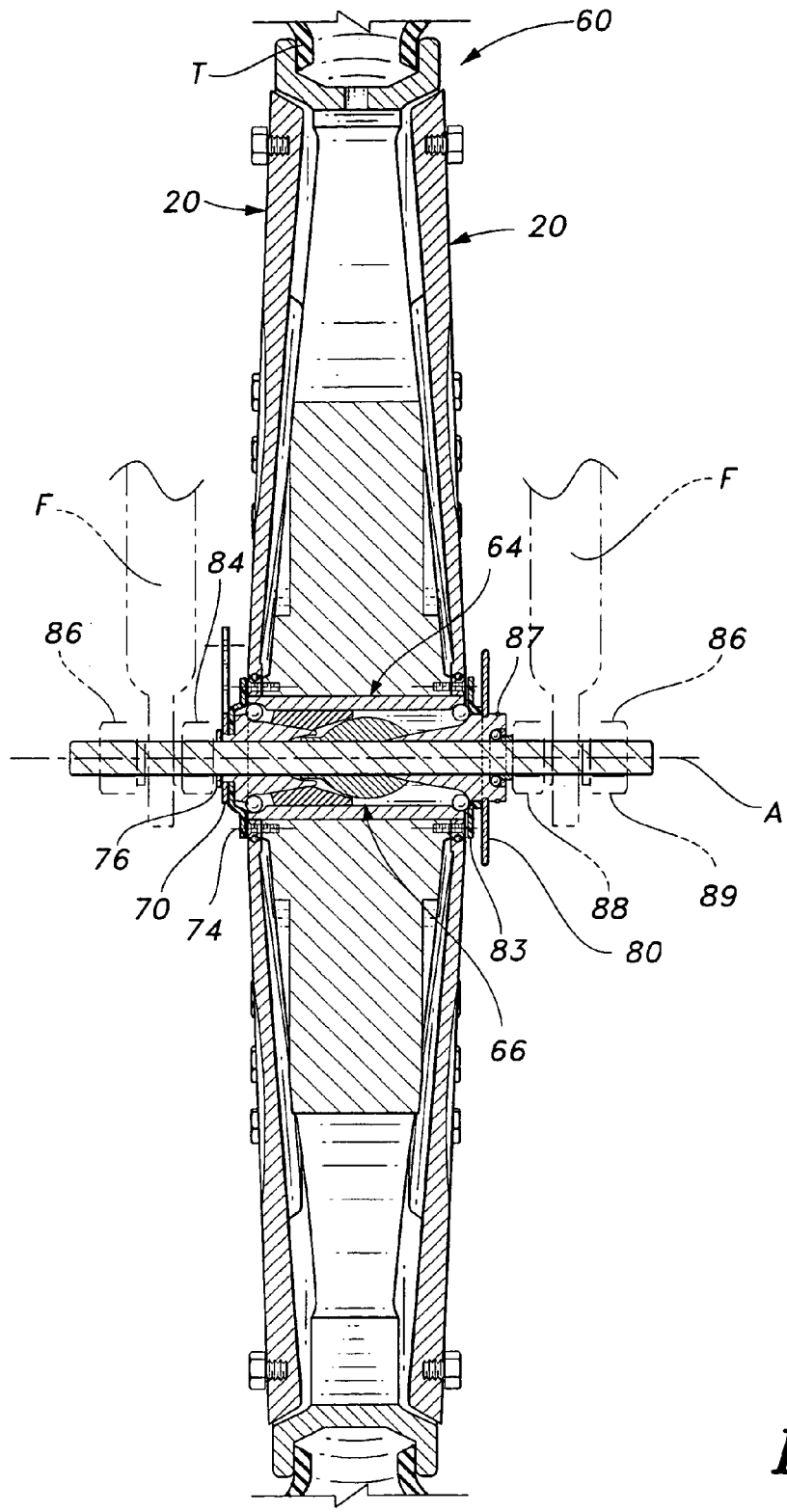
FIG. 8 is a section view drawn along lines 8—8 of FIG. 7.

Referring now to FIG. 5, the wheel 50 is shown with one spinner 20 exploded off the axle A on one side of the wheel 50 and the opposite spinner 20 assembled on the axle A. The exploded side of the wheel 50 shows the axle A inserted through the hub 54 of the wheel 50. The assembly of the wheel 50 on the axle A comprises components such as ball bearings 40, a cone shaped nut 38 and a washer 36. An annular groove 42 is disposed at the hub 54 around the central opening O of the wheel 50 to house free-floating ball bearings 40.

The ball bearings 40 are kept in the groove 42 with the cone shaped nut 38 that is threaded on the axle A. After the nut 38, the flat washer 36 is slid on the axle A. The washer 36 has an opening that is wider than the nut 38 so the washer 36 sits over the nut 38 but is flush against the sides of the hub 54. Since the flat washer 36 slides over the nut 38, a portion of the cone shaped nut 38 sits just outside the flat washer 36 on the axle A (not shown), thus completing the assembly of the wheel 50 on the axle A. The spinner 20, by its bearing system 31, can be mounted on the wheel 50 either before or after the wheel 50 is assembled on the axle A.

As shown in both FIGS. 4 and 5, once the wheel 50 is assembled on the axle A and the spinner 20 is mounted on the hub 54 of the wheel 50, a nut 45, a cap 44 and a nut 46 are then sequentially added to the axle A. The inner peripheral surface of the cap 44 and the nuts 45, 46 are threaded so it can be screwed on the axle A. Nuts 45, 46 are preferably hex nuts and can be formed integrally with the cap 44.

The cap 44 has a diameter wide enough to conceal the opening of the hub 54 and the fasteners 32 securing inner ring 34 to the wheel 50 to give the wheel 50 a clean, finished look making the spinner 20 and cap 44 look like one unified piece. Cap 44 is preferably a cone-shaped cap but can be other shapes so long as it conceals the opening of the hub 54 and fasteners 32. The cap 44 not only functions to conceal fasteners 32 and the opening of the hub 54, it also serves as a base to mount the fork K of the bicycle B on the axle A, thereby disposing the spinner 20 between the wheel 50 and the fork K. The fork K is secured on the axle A with a final nut 86, which can also be a hex nut. With a traditional bicycle the hub 54 would not have the cap 44, nuts 45, 46, nor hub extension 55, and the fork K would be mounted on the axle A right after the washer 36.

As shown in FIG. 1, the spinner 20 is used on both the front wheel 50 and the rear wheel 60 of the bicycle B. The rear wheel 60 of the bicycle B is shown in FIGS. 6–10. The spinner 20 is used in the same manner on both the front wheel 50 and the rear wheel 60 because both wheels 50, 60 are similar. The rear wheel 60, just like the front wheel 50, has a rim 78, a hub 64, and a structural member 62 connecting the hub 64 and the rim 78. The structural member 62, as with structural member 52 of the front wheel 50, may be decorated with indentations 61 and openings 68.

The type of bicycle B envisioned for use with the spinner 20 is a lower rider bicycle. However the spinner 20 can be foreseen to accessorize other types of bicycle wheels as well. Lower rider bicycles are not high-performance bicycles; they are not valued for their ability to perform instead they are valued for their aesthetics. The particular type of brake mechanism utilized by the bicycle B is therefore a simple coaster brake 66.

The coaster brake 66 mechanism is defined by its being housed in the hub 64 of the wheel 60. The coaster brake mechanism 66 stops the wheel 60 by expanding against the interior surface of the hub 64. The significance of using the coaster brake type of brake is that the wheel 60 does not require brake pads to squeeze the rim 78 of the wheel 60 from the outside. Brakes that use exterior mount brake pads cannot be used with the spinner 20 because the pads would interfere with the aesthetics of the wheel 60 and the rotation of the spinner 20.

Since the rear wheel 60 houses the coaster brake 66 within the hub 64, the diameter of the hub 64 is wider than the diameter of the hub 54 of the front wheel 50. Also, since the bicycle B anticipated for use with the spinner 20 travels at one speed, it only utilizes one sprocket gear 80.

Just like with the front wheel 50, hub 64 of the rear wheel 60 provides a hub extension 65 for the spinners 20, the structural member 62 being set back from the ends of the hub 64. Again, as with the front wheel 50, by mounting the spinner 20 over the hub 64 on hub extension 65, the spinner 20 does not have to take up space on the axle A, leaving space on the axle A for the brake arm 70, the sprocket gear 80 and the frame F.

Figure 9:
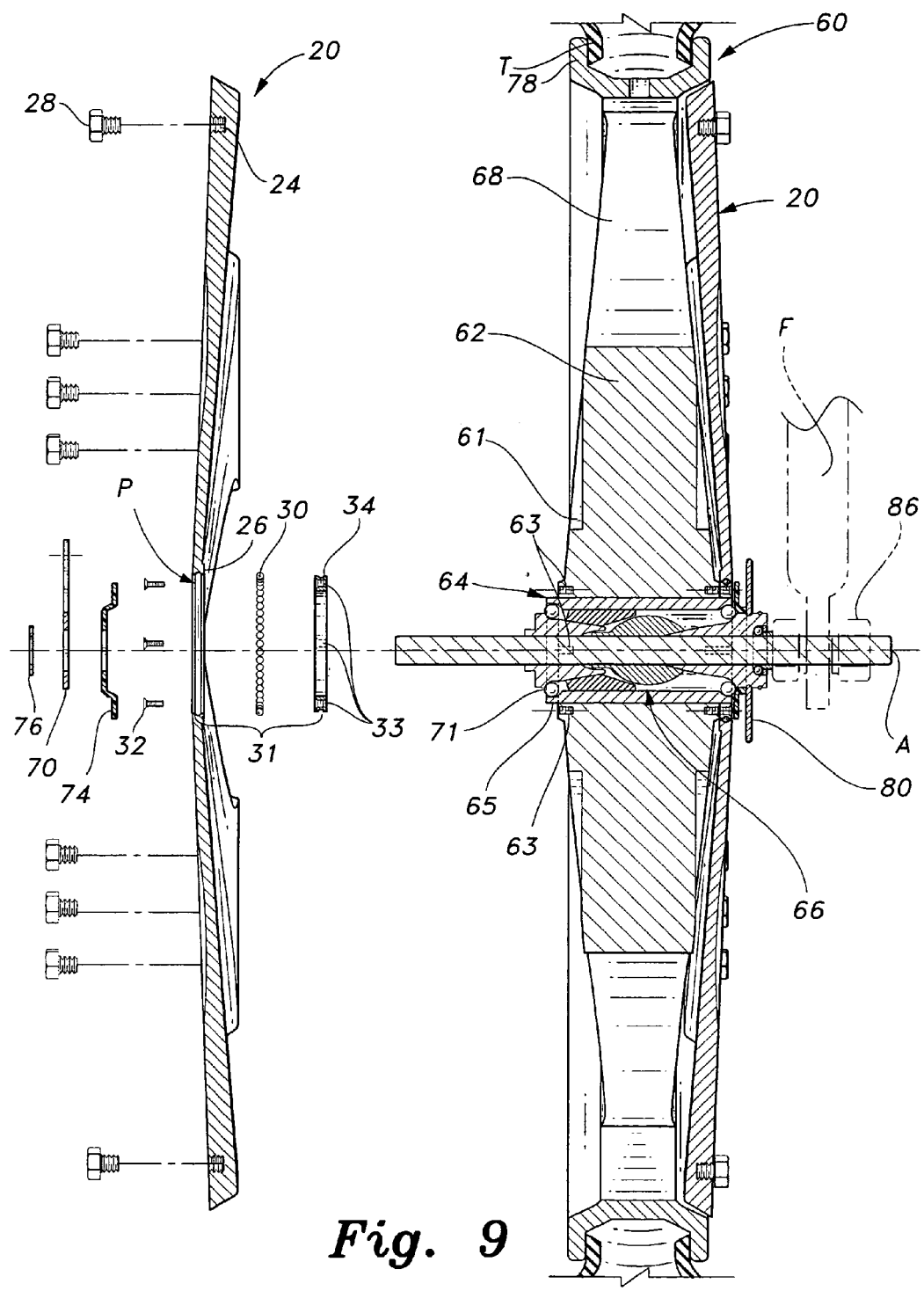
FIG. 9 is an exploded view of the section shown in FIG. 8, showing the brake side exploded.

As shown in FIG. 9, on the brake arm 70 side of the rear wheel 60, the spinner 20 and the bearing mechanism 31 are co-axially aligned with the axle A and are mounted over the hub 64 on the extension 65. The spinner 20 is secured to the wheel 60 by threading fasteners 32 through the openings 33 of the bearing system 31 and into the threaded bores 63 defined in the wheel 60.

After the spinner 20 is mounted on the wheel 60, a cap 74, is placed on the axle A. The cap 74 is a modification of a traditional cap used on the brake arm 70 side of the wheel 60 for bicycles having coaster brakes. The traditional cap serves only to cover the opening of the hub and conceal ball bearings 71 of the coaster brake 66. Here the cap 74 would be modified from the traditional cap by having its sides extend out to conceal both the ball bearings 71 disposed in the opening of the hub 64 and the fasteners 32 securing the inner ring 34 of the spinner 20 to wheel 60. The cap 74 will conceal how the spinner 20 is mounted on the wheel 60 to give the wheel 60 a clean, finished exterior appearance. After the cap 74 is slid on the axle A, the brake arm 70, a washer 76, and nut 84 are subsequently added onto the axle A. Nut 84 secures the cap 74, the brake arm 70 and the washer 76 on the axle A. Finally, after the nut 84, the frame F is mounted on the axle A with a nut 86 to secure the frame F on the axle A.

Figure 10:
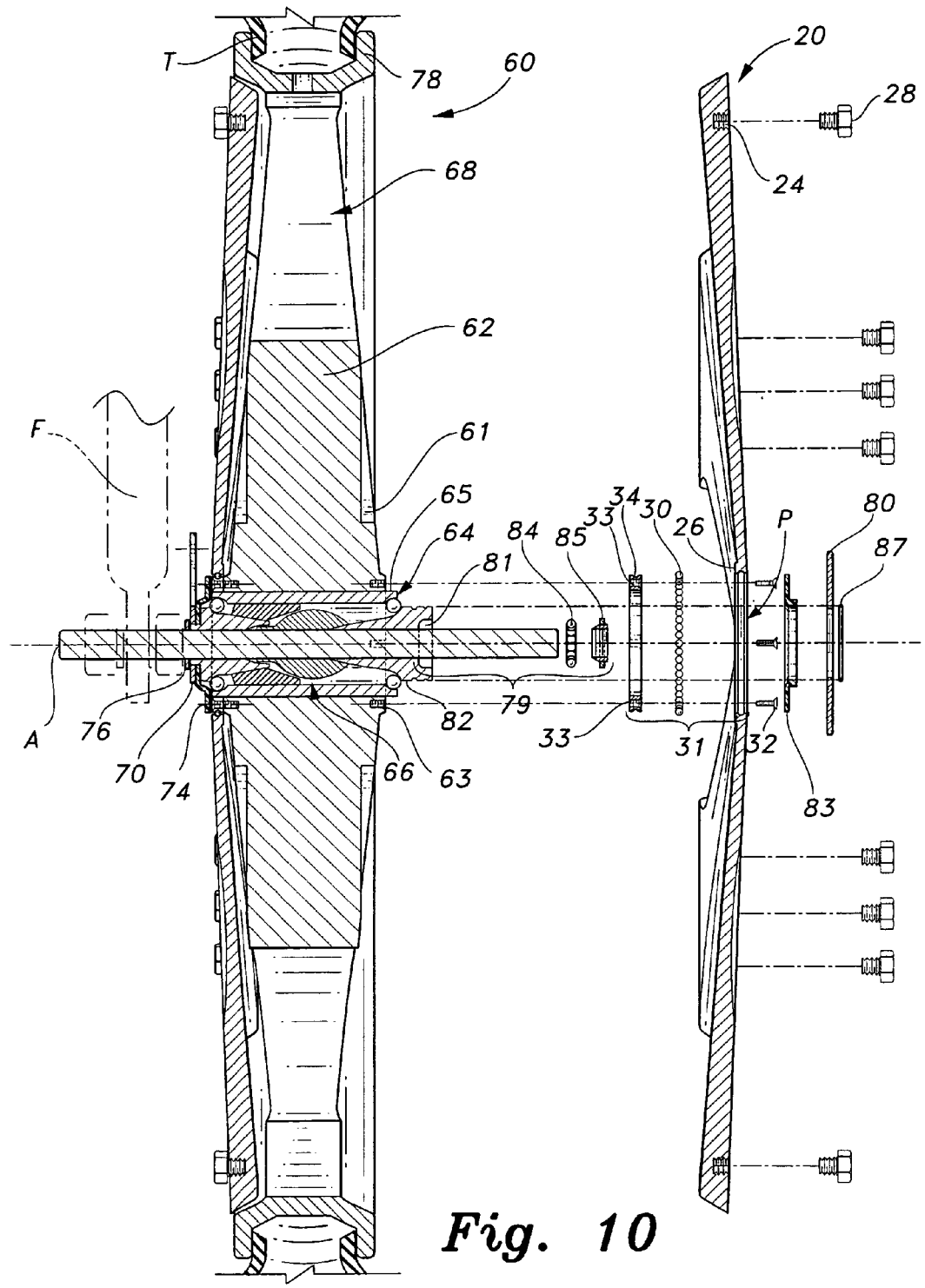
FIG. 10 is an exploded view of the section shown in FIG. 8, showing the sprocket side exploded.

FIG. 10 shows the sprocket gear 80 side of the rear wheel 60 with spinner 20 and the parts of the wheel 60 exploded off the axle A. The central opening P of the spinner 20 mounts over the hub 64 on hub extension 65. Again, as with the brake arm 70 side of the rear wheel 60, the spinner 20 used on the sprocket 80 side of the rear wheel requires the central opening P of the spinner 20 to be large enough to fit over the hub 64. Once the spinner 20 is mounted to the wheel 60 and secured by fasteners 32, the sprocket 80 may then be added to the rear wheel 60.

The sprocket 80 is disposed on a driver 82, which is part of the coaster brake 66 mechanism. The driver 82 is slid over the axle A and is threaded into the coaster brake mechanism 66. Part of the driver 82 is inserted in the hub 64, and the remaining part is disposed outside the opening of the hub 64. The part of the driver 82 resting outside the hub 64 serves as the place for the sprocket 80 to mount on. The spinner 20 must be mounted on the wheel 60 before the sprocket 80 is mounted on the driver 82 because the central opening P of the spinner 20 is not large enough to go over the sprocket 80.

As with a traditional bicycle, the sprocket 80 is placed on the driver 82 sandwiched between a spacer ring 83 and a tension ring 87. Normally the spacer ring 83 only serves to provide distance between the sprocket 80 and the opening of the hub 64. Here, however, the spacer ring 83 is modified from a traditional spacer ring that is merely a ring to now have a disc-like flange extending from one side of the spacer ring 83, which is adjacent the hub 64 and away from the sprocket 80. The disc-like flange of the spacer ring 83 is wide enough to cover the fasteners 32 securing the inner ring 34 of the bearing system 31. The spacer ring 83, therefore, not only provides distance between the sprocket 80 and the hub 64, but also serves to conceal the inner mechanics of the spinner 20 and give the wheel 60 a clean, finished look.

As mentioned above, the driver 82 is mounted on the axle A. Since the axle A is motionless, the driver 82 rotates about a bearing system 79 which comprises a ball bearing ring 84, a cone shaped nut with attached washer 85, and a ball bearing recess 81. The ball bearing recess 81 is defined within the driver 82 at the end farthest from the hub 64. The ball bearing ring 84 is held in ball bearing recess 81 by the cone shaped nut with attached washer 85. The nut with washer 85 not only serves to hold the ring 84 in place, but also to conceal the opening of the driver 82. After the washer with nut 85, a nut 88, the frame F, and a nut 89 are added to the end of the axle A to complete the assembly of the spinner 20, the sprocket 80 and the inner mechanics of the rear wheel 60 on the sprocket 80 side of the rear wheel 60.

As mentioned above, the wheels 50, 60 can be constructed as metal plates, one metal plate or spokes, while the spinner 20 can be solid or made of spokes. FIG. 11 shows an alternative embodiment of the present invention where a wheel 100 has a connecting body comprising spokes 102, as opposed to the metal plates as utilized in the preferred embodiment, and in which a spinner 120 has spoked arms 122, as opposed to flat plates as utilized with spinner 20.

The wheel 100 is shown to represent a front wheel of a bicycle B, but since the present invention is designed for use on a lower rider bicycle, where the front wheel is similar to a rear wheel, the alternative embodiment of wheel 100 and spinner 120 can be utilized for both front and rear wheels with slight modifications.

The wheel 100 is shown having a rim 108, a hub 104 and spokes 102. The spinner 120 has spoked arms 122, a bearing system 131, threaded openings 133 in the bearing system 131 and a rim 121. A disc or circular plate 101 is disposed on both sides of the hub 104. The spokes 102 are attached to circular plates 101. Circular plates 101 have threaded bores 103 that receive fasteners 132 to mount spinner 120 to wheel 100. Again, as with the preferred embodiment, the circular plates 101 are recessed from the ends of the hub 104 to create the hub extension 105. The extension 105 provides space for the spinner 120 to mount onto the wheel 100.

The spinner 120 mounts to the wheel 100 by the bearing system 131. The bearing system 131 permits the spinner 120 to rotate independent of the rotation of the wheel 100. As with the preferred embodiment for spinner 20, spinner 120 has a central opening Q. The central opening Q may be any diameter, that will permit the spinner 120 to mount on the hub 104 of the wheel 100. As an optional feature for use with the spoked arms 122, a spinner rim 121 is disposed at the end of the arms 122, opposite the bearing system 131. Once the spinner 120 is mounted on the wheel 100, a nut 145, a cap 144, a nut 146 are added on the axle A. The cap 144 is large enough in diameter to cover the opening of the hub 104 and the fasteners 132. The wheel 100 is then ready to receive the traditional parts of the wheel, either the fork K on the front wheel, or the frame F and the brake arm 70 or sprocket 80 on the rear wheel.

The wheel 50, 60, 100 is preferably made of lightweight steel, aluminum or other sturdy material. The spinner 20, 120 can be made of plastic or aluminum. The material used to construct the spinner 20, 120 makes it lighter and easier to spin around the wheel 50, 60, 100.

It is to be understood that the present invention is not limited to the embodiments described above, but encompasses any and all embodiments within the scope of the following claims.

We claim:

1. A bicycle wheel with spinner attachment, comprising:
    a wheel having a rim, a hub, and a structural member connecting the rim to the hub, the hub being hollow and adapted for receiving an axle of a bicycle, the hub having a hub extension protruding beyond the structural member;
    a spinner mount disposed on the hub extension and rigidly attached to the wheel for rotation therewith;
    a bearing assembly mounted on the spinner mount; and
    a spinner mounted on said bearing assembly for rotation about the spinner mount.

2. The bicycle wheel with spinner attachment according to claim 1, wherein said rim, said hub, and said structural member are formed as a unitary body.

3. The bicycle wheel with spinner attachment according to claim 1, wherein said structural member comprises a pair of flat, ornamental plates extending from the hub to the rim and facing opposite sides of the wheel.

4. The bicycle wheel with spinner attachment according to claim 1, wherein said rim, said structural member and said hub are made of a lightweight metal.

5. The bicycle wheel with spinner attachment according to claim 1, wherein said hub has a plurality of threaded bores defined therein, said spinner mount further comprising a plurality of fasteners extending through said spinner mount and being threaded into the bores defined in said hub.

6. The bicycle wheel with spinner attachment according to claim 1, wherein said bearing assembly comprises a groove defined in said spinner mount defining an inner race, an outer race attached to said spinner, and a plurality of ball bearings disposed between said inner race and said outer race.

7. The bicycle wheel with spinner attachment according to claim 1, said spinner comprises a plurality of spinner arms having an inner end attached to said bearing assembly and an opposing outer end.

8. The bicycle wheel with spinner attachment according to claim 7, further comprising a plurality of weights attached to the outer ends of said spinner arms.

9. The bicycle wheel with spinner attachment according to claim 8, wherein each said weight comprises a decorative bolt threaded to the outer end of said spinner arms.

10. The bicycle wheel with spinner attachment according to claim 1, wherein said spinner is made of plastic.

11. The bicycle wheel with spinner attachment according to claim 1, further comprising a cap disposed on the outer side of the spinner and the wheel, and conceal the bearing assembly.

12. The bicycle wheel with spinner attachment according to claim 1, wherein said hub comprises a hollow cylindrical body having opposing ends and a pair of parallel, spaced apart plates mounted on the cylindrical body and recessed from the opposing ends in order to define said hub extensions, said structural member comprising a plurality of spokes extending between said circular plates and said rim.

* * * * *